No. 646,125. Patented Mar. 27, 1900.
G. W. MESERVE.
COMBINED MORTISING AND BORING MACHINE.
(Application filed June 24, 1899.)
(No Model.) 5 Sheets—Sheet 1.

No. 646,125. Patented Mar. 27, 1900.
G. W. MESERVE.
COMBINED MORTISING AND BORING MACHINE.
(Application filed June 24, 1899.)
(No Model.) 5 Sheets—Sheet 2.

WITNESSES
Wm. H. Varnum.
L. C. Hills.

INVENTOR
George W. Meserve,
By J. Granville Meyers
Atty.

No. 646,125. Patented Mar. 27, 1900.
G. W. MESERVE.
COMBINED MORTISING AND BORING MACHINE.
(Application filed June 24, 1899.)

(No Model.) 5 Sheets—Sheet 3.

Witnesses:
L. C. Hills
Ray Taylor.

Inventor:
George W. Meserve,
By J. Granville Meyers Jr.
Attorney

No. 646,125. Patented Mar. 27, 1900.
G. W. MESERVE.
COMBINED MORTISING AND BORING MACHINE.
(Application filed June 24, 1899.)
(No Model.)
5 Sheets—Sheet 4.

Witnesses.
Robert Everett.
Wm. Stockbridge.

Inventor:
George W. Meserve.
By J. Granville Meyers
Atty.

No. 646,125. Patented Mar. 27, 1900.
G. W. MESERVE.
COMBINED MORTISING AND BORING MACHINE.
(Application filed June 24, 1899.)

(No Model.) 5 Sheets—Sheet 5.

Fig-15- Fig-16- Fig-17- Fig-18-

WITNESSES
Wm. H. Varnum.
L. C. Hills.

INVENTOR
George W. Meserve,
By J. Granville Meyers
Atty.

UNITED STATES PATENT OFFICE.

GEORGE W. MESERVE, OF BOSTON, MASSACHUSETTS.

COMBINED MORTISING AND BORING MACHINE.

SPECIFICATION forming part of Letters Patent No. 646,125, dated March 27, 1900.

Application filed June 24, 1899. Serial No. 721,796. (No model.)

*To all whom it may concern:*

Be it known that I, GEORGE W. MESERVE, a citizen of the United States, residing at Boston, in the county of Suffolk and State of Massachusetts, have invented certain new and useful Improvements in Woodworking-Machines; and I do hereby declare the following to be a full, clear, and exact description of the invention, such as will enable others skilled in the art to which it appertains to make and use the same.

This invention relates to a combined mortising and boring machine, and especially to that type of machines known as "endless-chain mortising-machines;" and it has for its object to provide a machine of the class referred to which will be light, compact, strong, durable, and economical in construction and efficient, rapid, and easy running in operation.

To these ends my invention consists in the features and in the construction, combination, and arrangement of parts hereinafter described, and particularly pointed out in the claims following the description, reference being had to the accompanying drawings, forming a part of this specification, wherein—

Figure 6:
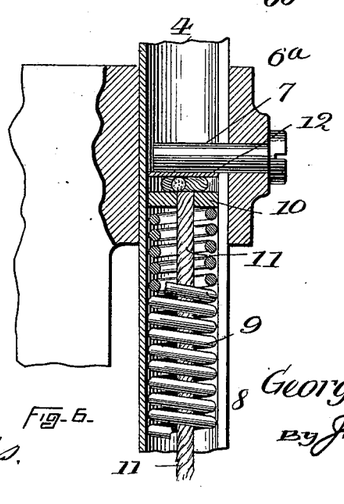
Fig. 6 is a detail sectional view illustrating one of the springs for retracting or lifting the cutting and boring tools out of the work.

Referring to the drawings, the numeral 1 indicates the upright frame of my improved machine provided with a flat base 2. Rigidly fixed in flanges 3, formed on or fixed to the front face of the frame, are two upright and parallel tubular guides 4, on which is adapted to slide a head-stock 5. As shown most clearly in Figs. 1 and 2 of the drawings, the head-stock is provided at its four corners with perforated lugs or collars 6 and $6^a$, which are loosely mounted on the tubular guides 4, the lowermost lugs or collars 6 carrying pins 7, that project at their inner ends through slots 8, formed in the sides of the tubular guides. Arranged in the tubular guides are coiled springs 9, (see Fig. 6,) on the upper ends of which are arranged centrally-perforated disks 10, through which are passed cords or cables 11, that are knotted at their upper ends above the disks and extend down centrally through the springs 9. Over the knitted ends of the cords or cables are disposed washers 12, that bear against the pins 7 in the collars 6 and operate to normally hold the head-stock elevated. The cords or cables 9 are led about guide-pulleys 13, journaled in slots formed in the front face of the frame beneath the lower ends of the tubular guides and at their lower ends are partially wound about pulleys 14, fixed on a horizontal shaft 15, journaled at its ends in the sides of the frame. Fixed on one end of the shaft 15 is a drum 16, preferably of less diameter than the pulleys 14, and wound about said drum is one end of a cord or cable 17, the outer end of which is attached to a treadle 18, pivotally connected to the lower portion of the frame 1. The operator or attendant by placing his foot on the treadle and depressing it compresses the coiled springs 9 and permits the head-stock to feed down by gravity in the manner and for the purpose hereinafter made apparent.

Figures 7, 8, 9, 10:
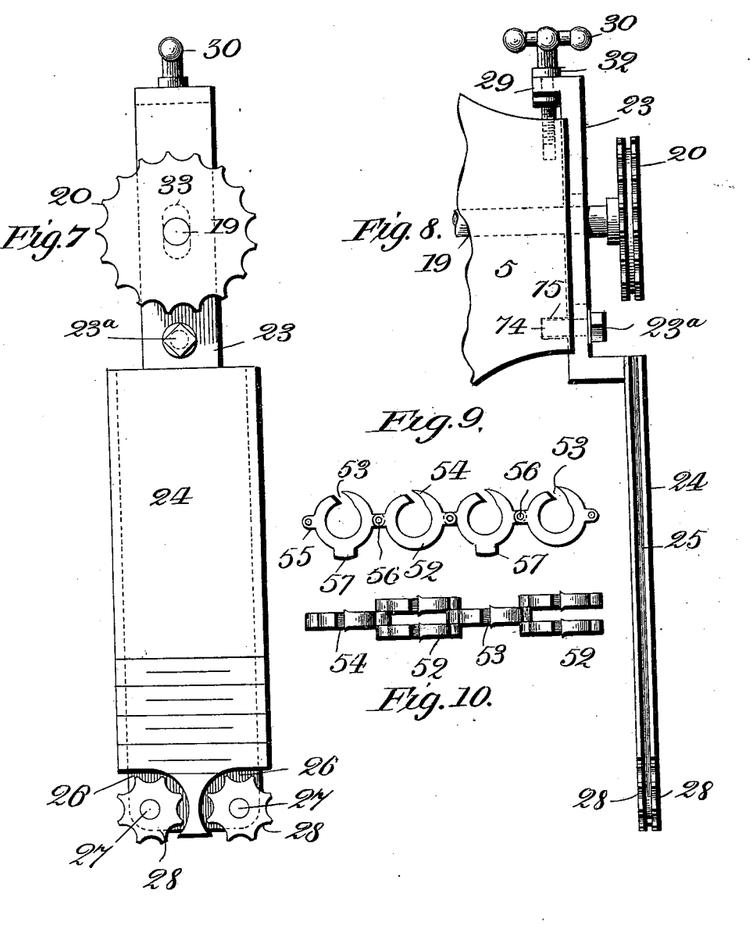
Fig. 7 is a detail view of the means employed for operatively mounting or supporting the endless chain saw.
Fig. 8 is an edge view of the same.
Figs. 9 and 10 are respectively a view in elevation and an edge view of the chain saw.

Journaled in and passing transversely through the head-stock is a shaft 19, on the forward end portion of which is fixed a grooved sprocket-wheel 20, and on the rear end thereof is fixed a pulley 21. The frame 1 is slotted vertically, as at 22, and through said slot passes the shaft 19, thus permitting the head-stock to freely move up and down on its tubular guides. The face of the head-stock is grooved or recessed vertically, and in said grooved or recessed face is seated a vertically-adjustable frame comprising a flat arm or bar 23, formed or provided at its lower end with a correspondingly-shaped depending arm 24, grooved on its opposite vertical edges, as at 25. The opposite corners of each side of the lower end of the arm 24 are provided with approximately segment-shaped recesses 26, and journaled in and extending transversely through said recessed portions of the arm are two shafts 27, on the opposite ends of which are fixed sprocket-wheels 28, that lie or are disposed in the recesses 26. The endless chain saw passes about the sprocket-wheels 20 and 27 and travels in the grooves 25 in the edges of the arm 24, whereby it is guided accurately in its movement about the sprocket-wheels. The chain-saw frame is made vertically adjustable in the following manner for maintaining the chain saw under the proper degree of tension: Formed on the upper end of the arm 23 is a laterally-projecting or overhanging flange 29, (most clearly shown in Fig. 8 of the drawings,) through which passes a hand-screw 30, that is screwed at its lower end into a threaded socket 31 formed in the top of the head-stock. Collars 32 on the screw 30 engage the opposite sides of the flange 29 and prevent the screw moving longitudinally independently of the head-stock. It is obvious that by turning the screw in one direction or the other the frame 23 24 will be adjusted up or down on the head-stock to vary the tension of the endless chain saw. To permit such adjustment, the bar or arm 23 is slotted vertically, as at 33, through which passes the shaft 19. The bar 23 is held to its seat in the grooved face of the head-stock by a screw $23^a$, which is screwed through a slot in the bar into the face of the head-stock.

Figures 1, 2, 3:
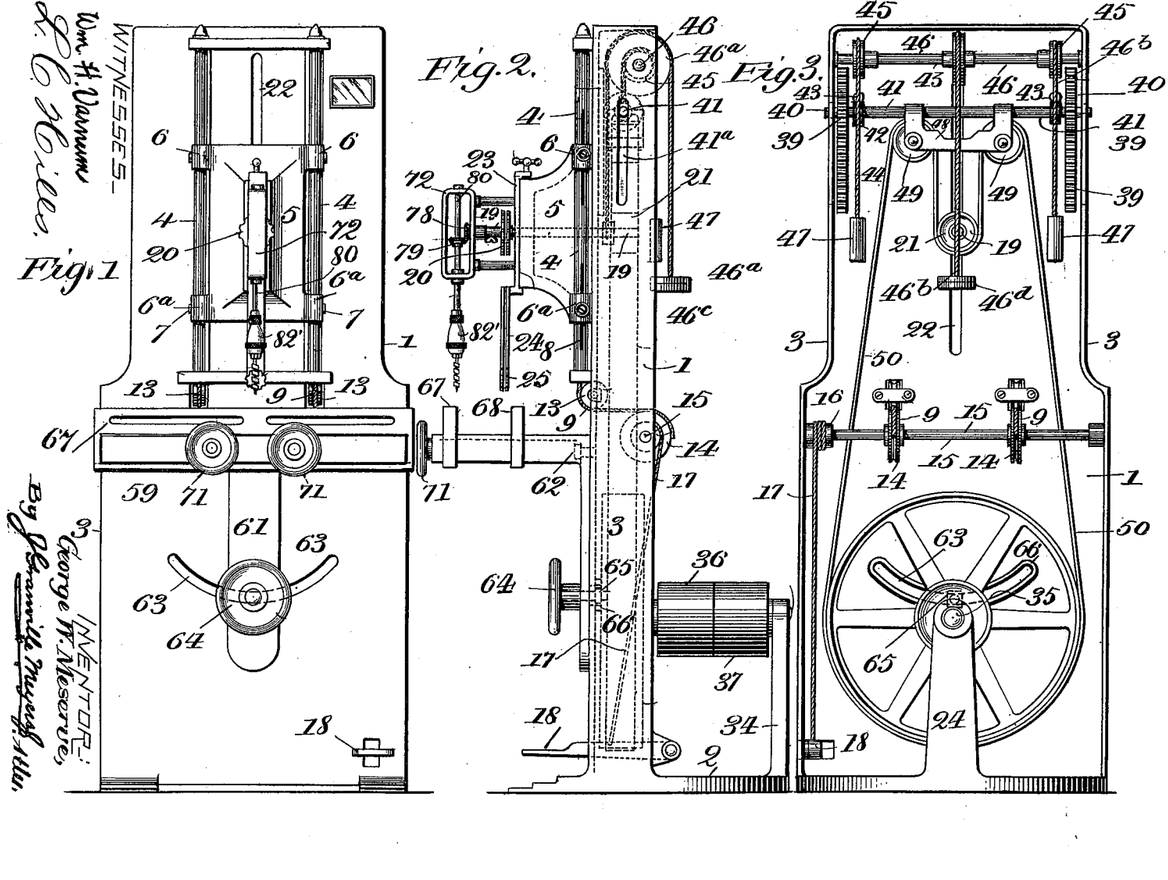
Figure 1 is a front elevation of my improved machine.
Fig. 2 is a side elevation thereof.
Fig. 3 is a rear elevation.

The shaft 19 is rotated or driven by gearing constructed as follows: Projecting upward from the rear end of the base 2 is a standard 34, in which and the frame 1 is journaled a horizontal shaft 35, carrying fast and loose pulleys 36 and 37 and having fixed thereon a relatively-large drive-pulley 38. Fixed to or formed on the opposite sides of the upper portion of the rear face of the frame 1 are parallel vertical racks 39, with which gear-pinions 40 mesh, said pinions being fixed on the opposite ends of a shaft 41, loosely arranged at its opposite ends in vertical slots $41^a$, formed in the sides of the frame 1. Loosely arranged on the opposite end portions of the shaft are collars 42, provided with perforated ears 43, to which are attached the ends of cords or cables 44, that pass over guide-pulleys 45, loosely supported on a shaft 46, journaled in the sides of the frame 1. To the free ends of the cords or cables 44 are attached weights 47, that normally hold the shaft 41 elevated. Suspended from the shaft 41 is a yoke 48, in the opposite lower ends of which are journaled guide-pulleys 49. A belt 50 passes around the drive-pulley 38, the guide-pulleys 49, and the pulley 21, fixed on the shaft 19, and it is obvious that the drive-pulley being put in motion by the fixed pulley 36 (driven from any suitable source of power) the belt 50, through the medium of the fixed pulley 21, will rotate the shaft 19, and thus set in motion the endless chain saw. As the head-stock is fed down the shaft 41, from which the guide-pulleys 49 are suspended, is automatically lowered to compensate for the downward movement of the shaft 19, the belt 50 remaining taut at all times. By means of the racks 39 and pulleys 40 the shaft 41 in its vertical movement is maintained in a true horizontal position.

Loosely journaled centrally on the shaft 46 is a pulley $46^a$, over which passes a cord or cable $46^b$, one end of which is attached to a loose collar $46^c$ on the shaft 19, and to the other end is attached a weight $46^d$, which should be somewhat lighter than the head-stock and the parts carried by the latter to permit the head-stock to feed down by gravity.

The endless chain saw comprises a plurality of links 51 and 52, pivotally connected together, each link consisting of a flat annulus divided or separated, as at 53, and provided with a tangentially-projecting cutter or saw tooth 54. The links are provided on their adjacent sides or edges with perforated lugs or ears 55, by means of which and rivets 56 they are pivotally connected together. In assembling the links 51 they are pivoted between the links 52, which are arranged in pairs, as most clearly shown in Fig. 9 of the drawings, the single links 51 thus alternating with the double or paired links 52. On the side of each link 51 opposite the saw-tooth 54 is formed a projecting lug 57, said lugs when the saw is in operation traveling in the grooves 25 in the edges of the saw-frame, thereby guiding the chain saw and causing the links 52 to travel accurately about the sprocket-wheels 20 and 27, the lugs passing between said sprocket-wheels.

Figures 12, 13:
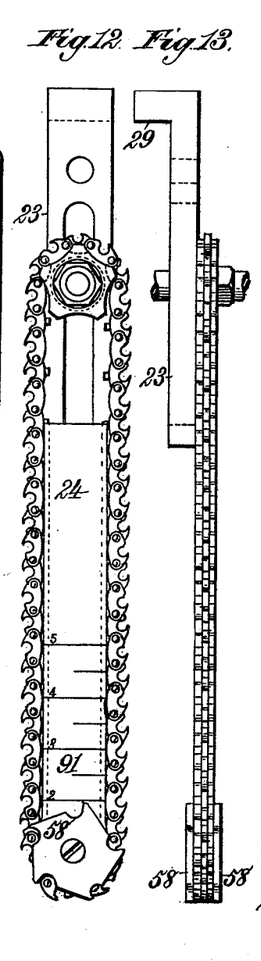
Fig. 12 is a similar view illustrating the circular saws in place.
Fig. 13 is an edge view of the parts shown in Fig. 12.

It is manifest that a single sprocket-chain may be substituted for the two sprocket-wheels 28 on each side of the lower end of the saw-frame similar to the sprocket-wheels 20; but the double arrangement of sprocket-wheels shown is preferred, as the bottom of the mortise cut by the saw is formed more nearly square or at right angles to the sides. If it be desired to cut a mortise wider than the chain saw, circular saws 58 may be fixed on the opposite ends of the shafts 27.

Figure 4:
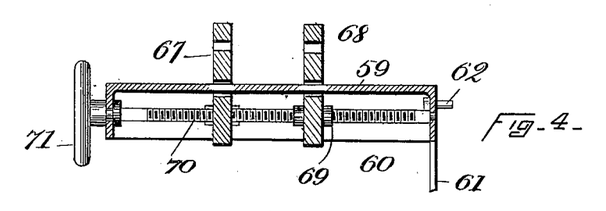
Figs. 4 and 5 are respectively a longitudinal sectional view and a bottom plan view of the table and work-holding mechanism.
Figure 5:
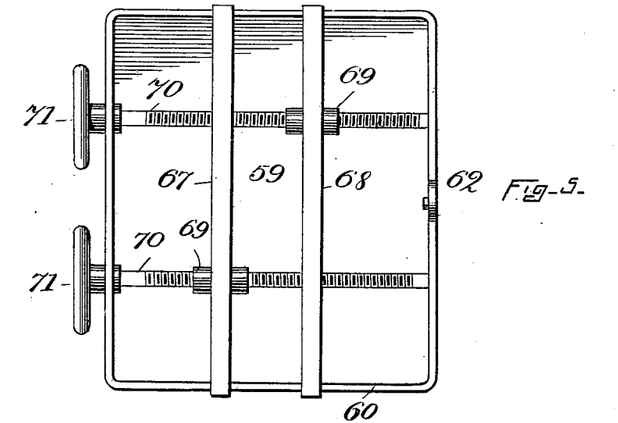

In order that mortises may be cut at any desired angles, I provide an adjustable work-table constructed as follows: The numeral 59 indicates a flat bed or table provided with a pendent flange 60 around its edge and provided at its rear edge with a downwardly-extending arm 61. The table is pivoted at its rear edge to the frame 1 by bolt 62, about which the table may be tilted or turned, and extending through the lower end of the arm 61 and through a segmental slot 63 in the frame 1 is a hand-screw 64, on the rear end of which is screwed a nut 65. By loosening the nut 65 the table may be adjusted to any desired angle in an obvious manner, and by tightening up the nut it is held in its adjusted position. The nut is preferably held stationary or prevented from turning in any suitable manner and the parts tightened and loosened by turning the hand-screw. In the drawings I have shown the nut arranged between two parallel segmental ribs or flanges 66, formed on the rear face of the frame, said ribs or flanges preventing the nut from turning; but any suitable or preferred means for accomplishing the same result may be employed. Arranged on the bed or table 59 are two independently-adjustable work-holding jaws 67 68. As shown, each of said jaws is provided with a slot through which the table passes, and fitted in the lower portions of the jaws are nuts or interiorly-threaded sleeves 69, through which pass adjusting-screws 70, that are journaled in the flanges 60 of the table and have fixed on their forward ends hand-wheels 71. By means of the adjusting-screws the jaws may be adjusted toward or from each other to suit the work to be mortised, and by making the jaws independently adjustable the work can be accurately centered beneath the saw.

Figure 11:
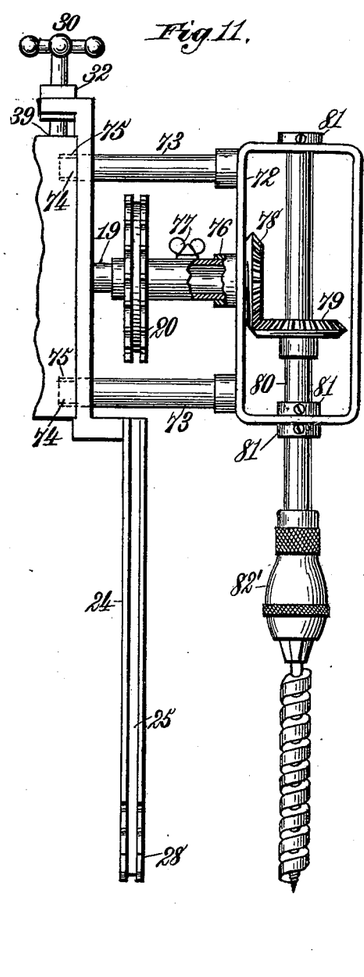
Fig. 11 is a detail view illustrating the boring attachment.
Figure 14:
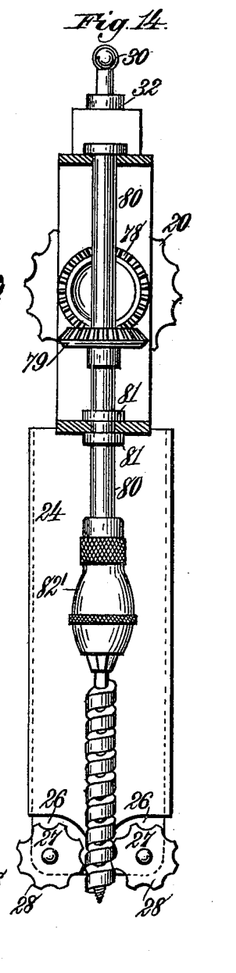
Fig. 14 is a view taken at right angles to Fig. 11.
Figures 15, 16, 17:
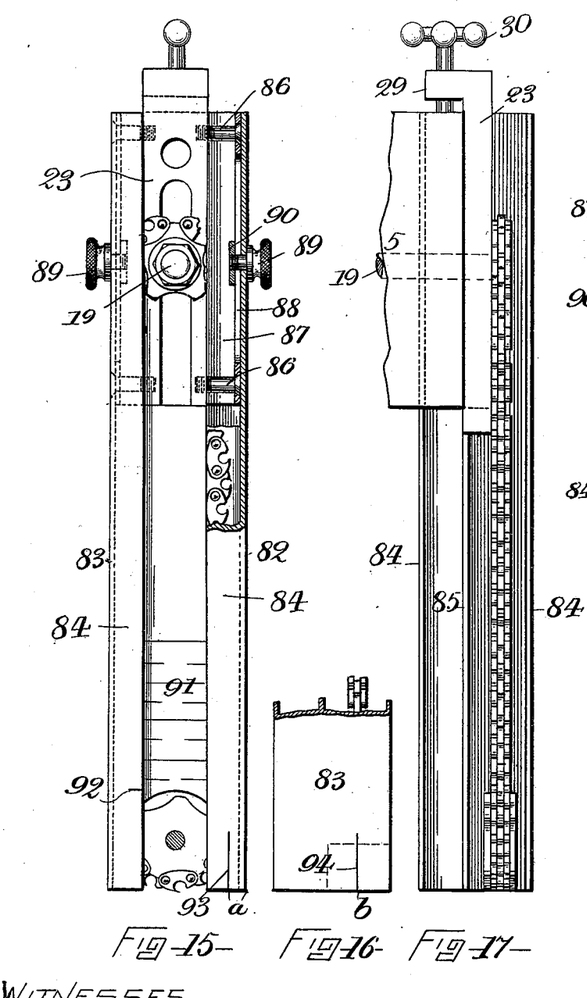
Fig. 15 is a view in elevation, partly in section, illustrating the saw guards and gage in place.
Fig. 16 is a detail view of the lower end of one of the guards.
Fig. 17 is a view in elevation of one of the guards viewed from the inner side.
Figure 18:
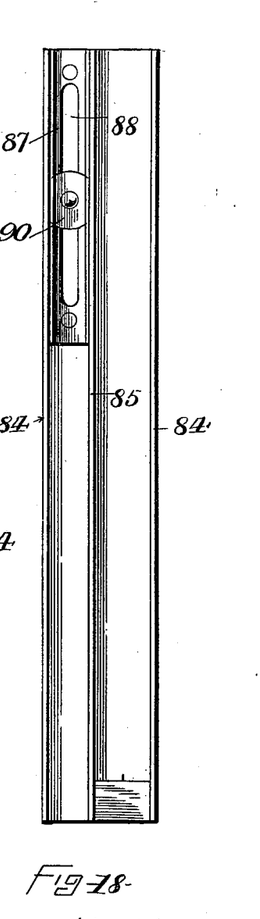
Fig. 18 is a similar view showing the guard detached.

The machine is provided with a removable boring attachment detachably connected to the head-stock constructed as follows: The numeral 72 indicates a rectangular skeleton frame having fixed to one side two laterally-projecting rods or arms 73, which are provided at their extremities with tenons 74, that are adapted to be fitted in corresponding sockets 75, formed in the face of the head-stock. Journaled in the side of the frame 72 is a sleeve 76, which when the frame is fitted in place on the head-stock slips over the shaft 19 and is fixed thereon by a set-screw 77. A bevel-gear 78 is fixed on the end of the sleeve 76 and gears with a similar gear-wheel 79, fixed on a vertical shaft 80, journaled in bearings formed in the top and bottom of the frame 72 and held in place by collars 81, fixed on said shaft. The lower end of the shaft 80 is provided with a chuck 82, in which is adapted to be fixed a boring-tool of any suitable or preferred construction.

The operation of my improved machine will be readily understood by those skilled in the art from the foregoing description. The work to be mortised is placed between the jaws 67 and 68 on the table 59 and the treadle 18 depressed, thereby contracting or drawing down the springs 9. As the endless chain saw cuts into the work to form the mortise the head-stock and saw-frame descend by gravity to feed the saw to its work, and when the mortise has been cut to the desired depth the treadle is released, whereupon the springs 9 expand and raise the head-stock, thereby withdrawing and lifting the saw. By varying the size of the weight $46^d$ any desired force can be given the gravity-feed of the saw. In similar manner holes may be bored in the work by setting in place the boring attachment before described.

Referring to Figs. 11 to 14 of the drawings, the numerals 82 and 83 indicate saw-guards, each comprising a channeled plate having side flanges 84, which project inwardly, and a similar intermediate rib 85. The guards are disposed upon the opposite sides of the head-stock and are adjustably secured to the latter in the following manner: Attached to the opposite sides of the head-stock by screws 86 are two metallic plates 87, U-shaped in cross-section and each provided with a longitudinal slot 88. The channeled guard-plates are fitted over said plates and are adjustably held to the latter by set-screws 89, which pass through perforations formed in the guards and through the slots 88, and on the inner ends of said screws are arranged nuts 90, which are each provided with two flat sides, as shown, and are arranged between one of the side flanges 84 and the intermediate rib 85, whereby the nuts are held against turning. In practice the set-screws holding the guard 82 in place will not be tightened up, whereby the guard will drop by gravity onto the work, and as the saw is fed down to cut the mortise will have a sliding movement on its plate 87. The set-screw holding the guard 83 in place is tightened up, so that said guard moves with the head-stock, and hence when the lower end of the guard abuts the work it operates as a stop to prevent the further descent of the saws, and thus regulates the depth of the mortise. By adjusting the guard 83 vertically on the head-stock the depth of the mortise may be regulated, and to facilitate such adjustment I form a series of graduations 91 on the saw-frame and a corresponding index mark or pointer 92 on the saw-guard 83. The depth to which the mortise will be cut will be thus indicated. As shown, both the guards embrace the saws and prevent the person of the operator from being injured.

A mark 93, formed on the lower front end of the guard 82, indicates to the operator where the mortise will end or, in other words, shows him how to arrange the work without the necessity of making measurements, and a similar mark 94 indicates the center of the mortise. In front of the mark 94 may be secured a small block of wood, through which the same will cut its way, and thus forms a chip-breaker to avoid the splintering of the wood as the saw emerges therefrom.

In some of the claims following this description the term "mortising-cutter" is employed and used in a broad sense to include the endless chain saw *per se* as well as the boring-bit herein described and shown.

Having described my invention, what I claim is—

1. In a mortising-machine, the combination with a frame and a work-table supported thereon, of a vertically-movable head-stock arranged above the table, an endless chain saw carried by the head-stock, a yielding support for the head-stock, and operating to raise the latter and withdraw the saw from the work, and means for depressing the said support to permit the head-stock to feed down by gravity, substantially as described.

2. In a mortising-machine, the combination with a frame and a work-table supported thereon, of a vertically-movable head-stock arranged above the table, an endless chain saw carried by the head-stock, a yielding support normally operating to raise and hold elevated the head-stock, and means controlled by the operator for depressing said support to permit the head-stock to feed down by gravity to advance the saw to the work, substantially as described.

3. In a mortising-machine, the combination with a frame and a work-table supported thereon, of a vertically-movable head-stock arranged above the table and fed toward the latter by gravity, an endless chain saw carried by the head-stock, coiled springs on which the head-stock is supported, said springs operating to raise the head-stock and withdraw the saw from the work, and means for compressing the springs to permit the head-stock to feed down by gravity, substantially as described.

4. In a mortising-machine, the combination with a frame and a work-table supported thereon, of a vertically-movable head-stock arranged above the table, an endless chain saw carried by the head-stock, a yielding support normally operating to raise and hold elevated the head-stock, means for depressing the said support to permit the head-stock to feed down by gravity and means for partially counterbalancing the head-stock, substantially as described.

5. In a mortising-machine, the combination with a frame and a work-table supported thereon, of a vertically-movable head-stock arranged above the table, an endless chain saw carried by the head-stock, a yielding support operating to normally raise and hold elevated the head-stock, means for depressing the said support to permit the head-stock to feed down by gravity, and means for partially counterbalancing the head-stock adjustably to regulate the force of the gravity-feed, substantially as described.

6. In a mortising-machine, the combination with a frame and a work-table supported thereon, of a vertically-movable head-stock arranged above the table and fed toward the latter by gravity, an endless chain saw carried by the head-stock, coiled springs on which the head-stock rests, and a treadle connected with the upper ends of the springs and operating to compress the latter to permit the descent of the head-stock toward the table, substantially as described.

7. In a mortising-machine, the combination with a frame and a work-table supported thereon, of tubular slotted guides vertically arranged parallel to one another on the face of the frame, a head-stock vertically movable on said guides and provided with projections extending into the slotted portions of the guides, coiled springs arranged in the guides beneath the projections and operating to raise the head-stock, means for compressing the springs to permit the head-stock to feed down by gravity, and an endless chain saw carried by the head-stock, substantially as described.

8. In a mortising-machine, the combination with the frame and the work-table supported thereon, of two tubular slotted guides vertically arranged parallel to one another on the face of the frame, a head-stock provided with perforated lugs freely movable on said guides, pins carried by the lugs and projecting into the slotted portions of the guides, coiled springs arranged in the guides beneath said pins and operating to raise the head-stock, cords or cables connected at their upper ends with the upper ends of the springs, a treadle connected with the other ends of the cords or cables and operating to compress the springs to permit the head-stock to feed down by gravity, and an endless chain saw carried by the head-stock, substantially as described.

9. In a mortising-machine, the combination with the frame, and the work-table supported thereon, of tubular slotted guides vertically arranged parallel to one another on the face of the frame, a head-stock vertically movable on said guides and provided with projections extending into the slotted portions of the latter, coiled springs arranged in the guides beneath the projections and operating to raise the head-stock, cords or cables connected at their upper ends to the upper ends of the springs, a transverse shaft journaled in the frame, pulleys fixed on said shaft about which the lower ends of said cords or cables are wound, a drum on said shaft, a treadle, a cord or cable connected at one end to the treadle and wound at its other end about the shaft, and an endless chain saw carried by the head-stock, substantially as described and for the purpose specified.

10. In a mortising-machine, the combination with the frame and the work-table supported thereon, of tubular slotted guides vertically arranged parallel to one another on the face of the frame, a head-stock vertically movable on said guides and provided with projections extending into the slotted portions of the latter, coiled springs arranged in the guides beneath the projections and operating to raise the head-stock, cords or cables connected at their upper ends to disks seated on the upper ends of the springs, a treadle connected with the lower ends of the cords or cables and operating to compress the springs to permit the head-stock to feed downward by gravity and an endless chain saw carried by the head-stock, substantially as described.

11. In a mortising-machine, the combination with a vertically-movable frame having grooves in its vertical edges and carrying a driven sprocket-wheel at its upper end and two guide sprocket-wheels journaled on each side of the frame at its lower end, of an endless chain saw arranged to travel about said sprocket-wheels, the diameter of the driven sprocket-wheel being equal to the distance between the outer sides of the lower sprocket-wheels whereby the vertical portions of the saw are caused to travel in parallel lines, and lugs on the inner side of the chain saw arranged to travel in and be guided by the grooves in the edges of the frame, substantially as described.

12. In a mortising-machine, the combination with a vertically-movable frame carrying driven sprocket-wheels at its upper end and guide sprocket-wheels at its lower end, said frame being grooved on its vertical edges, of an endless chain saw arranged to travel about the sprocket-wheels and comprising alternate double and single links pivotally connected together, each of said links consisting of a divided flat annulus provided with a tangentially-projecting saw-tooth, and each of said single links being provided on its inner side with a projecting lug arranged to travel in the grooves in the edges of the frame, substantially as described.

13. An endless chain saw for cutting mortises, comprising alternate double and single links pivotally connected together, each link consisting of a flat divided annulus one end of which is beveled to form a saw-tooth and is projected outward tangentially, substantially as shown and described.

14. In a mortising-machine, the combination with a vertically-movable frame carrying a driven sprocket-wheel at its upper end, of two sprocket-wheels journaled on each side of the lower end of the frame, and an endless chain saw arranged to travel about said sprocket-wheels, the diameter of the driven sprocket-wheel being equal to the distance between the outer sides of the lower sprocket-wheels, whereby the vertical portions of the saw are caused to travel in parallel lines, substantially as described.

15. In a mortising-machine, the combination with the frame and the work-table supported thereon, of a vertically-movable head-stock arranged above the table, a yielding support normally operating to raise and hold elevated the head-stock, means for depressing the said support to permit the head-stock to feed down by gravity, a sprocket-wheel carried by the head-stock, an endless chain saw arranged to travel about the sprocket-wheel, a drive pulley and belt for driving the sprocket-wheels, and means for automatically taking up the slack of the belt as the head-stock is fed down by gravity, substantially as described.

16. In a mortising-machine, the combination with the frame and the work-table supported thereon, of a vertically-movable head-stock arranged above the table, a yielding support normally operating to raise and hold elevated the head-stock, means for depressing the said support to permit the head-stock to feed down by gravity, a shaft journaled transversely in the head-stock, a driving sprocket-wheel fixed on the outer end of the shaft, a pulley fixed on the inner end of the shaft, a saw-supporting frame carried by the head-stock and carrying guide sprocket-wheels at its lower end, an endless chain saw arranged to travel about the said sprocket-wheels, a drive-pulley, a belt connecting said drive-pulley and the pulley on the shaft, and means for automatically taking up the slack of the belt as the head-stock is fed down by gravity, substantially as described.

17. In a mortising-machine, the combination with the frame and the work-table supported thereon, of a vertically-movable head-stock arranged above the table and fed toward the latter by gravity, a shaft journaled transversely in the head-stock, a driving sprocket-wheel fixed on the outer end of the shaft, a pulley fixed on the inner end of the shaft, a saw-supporting frame carried by the head-stock and carrying guide sprocket-wheels at its lower end, an endless chain saw arranged to travel about the said sprocket-wheels, a drive-pulley, guide-pulleys journaled in a yieldingly-supported yoke above the pulley on the sprocket-wheel shaft, and a driving-belt passing about the driving-pulley and about the guide-pulleys and the pulley on the sprocket-wheel shaft, substantially as described.

18. In a mortising-machine, the combination with the frame and the work-table supported thereon, of a vertically-movable head-stock arranged above the table and fed toward the latter by gravity, a shaft journaled transversely in the head-stock, a driving sprocket-wheel fixed on the outer end of the shaft, a pulley fixed on the inner end of the shaft, a saw-supporting frame carried by the head-stock and carrying guide sprocket-wheels at its lower end, an endless chain saw arranged to travel about the said sprocket-wheels, a drive-pulley, a shaft loosely passed through guide-slots in the sides of the frame, means for yieldingly holding said shaft elevated, a yoke suspended from said shaft, guide-pulleys journaled in said yoke and a driving-belt passing about the drive-pulley, the guide-pulleys, and the pulley on the sprocket-wheel shaft, substantially as described.

19. In a mortising-machine, the combination with the frame, of a vertically-movable head-stock arranged to be fed down by gravity toward the work, a shaft journaled transversely in the head-stock, a driving sprocket-wheel fixed on the outer ends of the shaft, a pulley fixed on the inner end of the shaft, a saw-supporting frame carried by the head-stock and carrying guide sprocket-wheels at its lower ends, an endless chain saw arranged to travel about the said sprocket-wheels, a drive-pulley, a shaft loosely passed through guide-slots in the sides of the frame, pinions fixed on the opposite end portions of said shaft, vertical racks on the frame in engagement with said pinions, a yoke suspended from said shaft, guide-pulleys journaled in the yoke, a driving-belt passing about the driving-pulley, guide-pulleys and the pulley on the sprocket-wheel shaft, and weighted cords or cables passing over pulleys supported above the yoke-shaft and each connected at one end to the latter, substantially as described.

20. In a mortising-machine, the combination with the frame, of a vertically-movable head-stock arranged to be fed down by gravity toward the work, a shaft journaled transversely in the head-stock, a driving sprocket-wheel fixed on the outer end of the shaft, a pulley fixed on the inner end of the shaft, a saw-supporting frame carried by the head-stock and carrying guide sprocket-wheels at its lower end, an endless chain saw arranged to travel about the said sprocket-wheels, a drive-pulley, a belt connecting said drive-pulley and the pulley on the shaft, means for automatically taking up the slack of the belt as the head-stock is fed down by gravity, a guide-pulley supported in the upper part of the frame, a cord or cable passing over the guide-pulley and attached at one end to the sprocket-wheel shaft, and a weight attached to the other end of the cord or cable, substantially as described.

21. In a machine of the class described the combination with the frame, of a vertically-movable head-stock arranged to be fed to and from the work, a shaft journaled transversely in the head-stock, a mortising-cutter arranged to be operated by said shaft, a pulley fixed on the inner end of said shaft, a drive-pulley, a vertically-movable shaft, pinions fixed on the opposite end portions of said shaft, vertical racks with which said pinions mesh, guide-pulleys carried by said vertically-movable shaft, a driving-belt passing about the driving-pulley, guide-pulleys and pulley on the transverse shaft, and weighted cords passing over idler-pulleys supported above the vertically-movable shaft and each connected at one end to the latter, substantially as described.

22. In a machine of the class described, the combination with the frame thereof, of a vertically-movable head-stock arranged to be fed to and from the work, a shaft journaled transversely in the head-stock, a mortising-cutter arranged to be operated by said shaft, a pulley fixed on the inner end of said shaft, a drive-pulley, a vertically-movable shaft, means for guiding said latter-named shaft in its movements, guide-pulleys carried by the vertically-movable shaft, a driving-belt passing about the drive-pulley, guide-pulleys and pulley on the transverse shaft, and weighted cords passing over idler-pulleys supported above the vertically-movable shaft and each connected at one end to said shaft, substantially as described.

23. In a woodworking-machine, the combination with the frame and a work-table supported thereon, of a vertically-movable head-stock arranged above the table, a transverse shaft journaled in the head-stock, means for rotating said shaft, a mortising-cutter operatively connected to said shaft, a yielding support for the head-stock operating to raise the latter and withdraw the cutter from the work, and means for depressing the said support to permit the head-stock to feed down by gravity, substantially as described.

24. In a machine of the class described, the combination with the frame and the work-table supported thereon, of a vertically-movable head-stock arranged above the table, means for feeding said head-stock to and from the table, a shaft journaled transversely in the head-stock, a mortising-cutter arranged to be operated by said shaft, a pulley fixed on the inner end of the transverse shaft, a drive-pulley, a vertically-movable shaft 41, means for yieldingly holding said shaft elevated, a yoke suspended from said shaft, guide-pulleys journaled in said yoke, and a driving-belt passing about the drive-pulley, the guide-pulleys, and the pulley on the transverse shaft, substantially as described.

25. In a machine of the class described, the combination with the frame and the work-table supported thereon, of a vertically-movable head-stock arranged above the table, means for feeding said head-stock to and from the table, a shaft journaled transversely in the head-stock, a mortising-cutter arranged to be operated by said shaft, a pulley fixed on the inner end of the transverse shaft, a drive-pulley, a vertically-movable shaft, means for guiding said shaft in its movements and means for yieldingly holding said shaft elevated, guide-pulleys carried by the vertically-movable shaft, and a driving-belt passing about the drive-pulley, the guide-pulleys and the pulley on the transverse shaft, substantially as described.

26. In a machine of the class described, the combination with the frame and work-table supported thereon, of a vertically-movable head-stock arranged above the table, a yielding support normally operating to raise and hold elevated the head-stock, means for depressing the said support to permit the head-stock to feed down by gravity, a mortising-cutter carried by the head-stock, a drive pulley and belt for rotating said cutter, and means for automatically taking up the slack of the belt as the head-stock is fed down by gravity, substantially as described.

27. In a machine of the class described, the combination with a frame and a work-table supported thereon, of a vertically-movable head-stock arranged above the table, a mortising-cutter carried by the head-stock, a yielding support for the head-stock operating to raise the latter and withdraw the cutter from the work, and means for depressing the said support to permit the head-stock to feed down by gravity, substantially as described.

28. In a woodworking-machine, the combination with a frame and a work-table supported thereon, of a vertically-movable head-stock arranged above the table, a mortising-cutter carried by the head-stock, a yielding support normally operating to raise and hold elevated the head-stock, and means controlled by the operator for depressing said support to permit the head-stock to feed down by gravity to advance the cutter to the work, substantially as described.

29. In a woodworking-machine, the combination with a frame and a work-table supported thereon, of a vertically-movable head-stock arranged above the table, a mortising-cutter carried by the head-stock, a yielding support normally operating to raise and hold elevated the head-stock, means for depressing said support to permit the head-stock to feed down by gravity, and means for partially counterbalancing the head-stock, substantially as described.

30. In a woodworking-machine, the combination with a frame and a work-table supported thereon, of a vertically-movable head-stock arranged above the table and fed toward the latter by gravity, a mortising-cutter carried by the head-stock, springs on which the head-stock is supported, said springs operating to raise the head-stock and withdraw the cutter from the work, and means for compressing the springs to permit the head-stock to feed down by gravity, substantially as described.

31. In a woodworking-machine, the combination with a frame and a work-table supported thereon, of a vertically-movable head-stock arranged above the table, a mortising-cutter carried by the head-stock, a yielding support operating to normally raise and hold elevated the head-stock, means for depressing the said support to permit the head-stock to feed down by gravity, and means for partially counterbalancing the head-stock adjustably to regulate the force of the gravity-feed, substantially as described.

32. In a woodworking-machine, the combination with a frame and a work-table, of a vertically-movable head-stock arranged above the table and fed toward the latter by gravity, a mortising-cutter carried by the head-stock, coiled springs on which the head-stock rests, and a treadle connected with the upper ends of the springs and operating to compress the latter to permit the descent of the head-stock toward the table, substantially as described.

33. In a woodworking-machine, the combination with a frame and a work-table supported thereon, of tubular slotted guides vertically arranged parallel to one another on the face of the frame, a head-stock vertically movable on said guides and provided with projections extending into the slotted portions of the guides, coiled springs arranged in the tubular guides beneath the projections and operating to raise the head-stock, means for compressing the springs to permit the head-stock to feed down by gravity, and a mortising-cutter carried by the head-stock, substantially as described.

34. In a woodworking-machine, the combination with the frame and the work-table supported thereon, of two tubular slotted guides vertically arranged parallel to one another on the face of the frame, a head-stock provided with perforated lugs freely movable on said guides, pins carried by the lugs and projecting into the slotted portions of the guides, coiled springs arranged in the guides beneath said pins and operating to raise the head-stock, cords or cables connected at their upper ends to the upper ends of the springs, a treadle connected with the other ends of the cords or cables and operating to compress the springs to permit the head-stock to feed down by gravity, and a mortising-cutter carried by the head-stock, substantially as described.

35. In a woodworking-machine, the combination with the frame, and the work-table supported thereon, of tubular slotted guides vertically arranged parallel to one another on the face of the frame, a head-stock vertically movable on said guides and provided with projections extending into the slotted portions of the latter, coiled springs arranged in the guides beneath the projections and operating to raise the head-stock, cords or cables connected at their upper ends to the upper ends of the springs, a transverse shaft journaled in the frame, pulleys fixed on said shaft about which the lower ends of said cords or cables are wound, a drum on said shaft, a treadle, a cord or cable connected at one end to the treadle and wound at its other end about the shaft, and a mortising-cutter carried by the head-stock, substantially as described.

36. In a mortising-machine, the combination with the frame, the vertically-movable head-stock supported thereon, and an endless chain saw carried by the head-stock of a work-table supported on the frame beneath the saw, and two centrally-slotted jaws loosely embracing the edges and top and bottom of the table and each provided at its lower end with a fixed nut, and hand-screws each engaging one of said nuts and journaled at its ends to the under side of the table, substantially as described.

37. In a woodworking-machine, the combination with a frame and a work-table, of a vertically-movable head-stock arranged above the table and fed toward the latter by gravity, a mortising-cutter carried by the head-stock, means for operating said cutter, a movable support for the head-stock normally acting to hold the same elevated, and means for moving said support away from the head-stock to allow the latter to feed down by gravity.

38. In a mortising-machine, the combination with a vertically-movable head-stock and an endless chain saw carried thereby, of vertically-movable saw-guards carried by the head-stock and inclosing the opposite edges of the saw, substantially as described.

39. In a mortising-machine, the combination with a vertically-movable head-stock and an endless chain saw carried thereby, of vertically-adjustable saw-guards carried by the head-stock and embracing the saw, graduations marked on the saw-frame, and an index-mark or pointer on one of the saw-guards, substantially as described.

40. In a mortising-machine the combination with a vertically-movable head-stock and an endless chain saw carried thereby, of vertically-adjustable saw-guards carried by the head-stock and comprising channeled plates embracing the opposite sides of the saw, substantially as described.

41. In a mortising-machine, the combination with a vertically-movable head-stock and an endless chain saw carried thereby, of a vertical plate U-shaped in cross-section attached to the head-stock and having a vertical slot, a saw-guard comprising a channeled plate vertically movable on the U-shaped plate and embracing one side of the saw, a set-screw passing through the saw-guard and the vertical slot in the said plate, and a nut screwed over the inner end of said set-screw and having flat sides engaged by the sides of the U-shaped plate, substantially as described and for the purpose specified.

In testimony whereof I affix my signature in presence of two witnesses.

GEORGE W. MESERVE.

Witnesses:
GEORGE W. ANDERS,
CHAS. E. FEHON.